(12) United States Patent
Wang

(10) Patent No.: US 12,075,804 B2
(45) Date of Patent: Sep. 3, 2024

(54) SYSTEM AND METHOD FOR ESTIMATING FOODSTUFF COMPLETION TIME

(71) Applicant: June Life, LLC, San Francisco, CA (US)

(72) Inventor: Wiley Wang, San Francisco, CA (US)

(73) Assignee: June Life, LLC, San Francisco, CA (US)

( * ) Notice: Subject to any disclaimer, the term of this patent is extended or adjusted under 35 U.S.C. 154(b) by 712 days.

(21) Appl. No.: 17/345,125

(22) Filed: Jun. 11, 2021

(65) Prior Publication Data

US 2021/0298334 A1 Sep. 30, 2021

Related U.S. Application Data

(62) Division of application No. 17/100,046, filed on Nov. 20, 2020, now Pat. No. 11,058,132.

(60) Provisional application No. 62/937,996, filed on Nov. 20, 2019.

(51) Int. Cl.
*A47J 36/32* (2006.01)
*A23L 5/10* (2016.01)

(52) U.S. Cl.
CPC ............... *A23L 5/10* (2016.08); *A47J 36/32* (2013.01); *A47J 36/321* (2018.08); *A47J 2202/00* (2013.01); *G01K 2207/06* (2013.01)

(58) Field of Classification Search
CPC ...... A47J 36/321; A47J 36/32; A47J 2202/00; A23L 5/10
USPC .......................................... 99/325, 327, 332
See application file for complete search history.

(56) References Cited

U.S. PATENT DOCUMENTS

| | | | |
|---|---|---|---|
| 3,453,997 A | 7/1969 | Klepzig | |
| 3,841,298 A | 10/1974 | Sellors | |
| 3,911,893 A | 10/1975 | Baker et al. | |
| 4,158,432 A | 6/1979 | Van | |
| 4,177,369 A | 12/1979 | Fritts | |
| 4,291,616 A | 9/1981 | Taylor | |
| 4,363,957 A | 12/1982 | Tachikawa et al. | |
| 4,415,790 A | 11/1983 | Diesch et al. | |
| 4,430,540 A | 2/1984 | Scalf | |
| 4,447,692 A | 5/1984 | Mierzwinski | |
| D281,480 S | 11/1985 | Mcclelland | |
| 4,568,810 A | 2/1986 | Carmean | |
| 4,591,684 A | 5/1986 | Tanabe et al. | |
| 4,625,086 A | 11/1986 | Karino | |
| D289,488 S | 4/1987 | Gyebnar | |
| 5,005,123 A | 4/1991 | Mierzwinski | |

(Continued)

FOREIGN PATENT DOCUMENTS

| CN | 1900858 A | 1/2007 |
|---|---|---|
| CN | 101504158 A | 8/2009 |

(Continued)

OTHER PUBLICATIONS

U.S. Appl. No. 12/216,999, filed Jul. 14, 2008, Kim, et al.

(Continued)

*Primary Examiner* — Reginald Alexander
(74) *Attorney, Agent, or Firm* — Banner & Witcoff, Ltd.

(57) ABSTRACT

A system and method for estimating a time to foodstuff completion can include receiving a measured foodstuff parameter, determining a current foodstuff state based on: a previous foodstuff state and the measured foodstuff parameter, selecting a foodstuff parameter curve based on the current foodstuff state, determining an estimated time to completion using the foodstuff parameter curve.

10 Claims, 8 Drawing Sheets

(56) References Cited

U.S. PATENT DOCUMENTS

| | | |
|---|---|---|
| 5,044,262 A | 9/1991 | Burkett et al. |
| 5,154,940 A | 10/1992 | Budzyna et al. |
| 5,170,024 A | 12/1992 | Hanatani et al. |
| 5,189,947 A | 3/1993 | Yim |
| 5,360,965 A | 11/1994 | Ishii et al. |
| 5,361,681 A | 11/1994 | Hedstroem et al. |
| 5,412,448 A | 5/1995 | Kunishige |
| D360,804 S | 8/1995 | Hamada et al. |
| 5,498,856 A | 3/1996 | Carlsson |
| 5,520,095 A | 5/1996 | Huber et al. |
| 5,546,475 A | 8/1996 | Bolle et al. |
| 5,981,916 A | 11/1999 | Griffiths et al. |
| 6,011,242 A | 1/2000 | Westerberg |
| 6,060,701 A | 5/2000 | Mckee et al. |
| 6,196,115 B1 | 3/2001 | Tsao |
| 6,299,921 B1 | 10/2001 | Loeffler et al. |
| 6,310,964 B1 | 10/2001 | Mohan et al. |
| 6,359,270 B1 | 3/2002 | Bridson |
| 6,367,409 B1 | 4/2002 | Broom |
| 6,384,384 B1 | 5/2002 | Connolly et al. |
| 6,486,453 B1 | 11/2002 | Bales et al. |
| 6,759,635 B2 | 7/2004 | Lile |
| 6,789,067 B1 | 9/2004 | Liebenow |
| 6,821,016 B2 | 11/2004 | Sato et al. |
| 6,852,953 B1 | 2/2005 | Lee |
| 6,856,247 B1 | 2/2005 | Wallace |
| 6,862,494 B2 | 3/2005 | Hu et al. |
| 7,013,661 B2 | 3/2006 | Gatling et al. |
| 7,102,107 B1 | 9/2006 | Chapman |
| 7,150,891 B2 | 12/2006 | Greiner et al. |
| 7,445,381 B2 | 11/2008 | Rund et al. |
| 7,516,692 B2 | 4/2009 | Pirkle et al. |
| 7,566,168 B2 | 7/2009 | Rund et al. |
| 7,663,502 B2 | 2/2010 | Breed |
| D620,743 S | 8/2010 | Hsiao |
| 7,845,823 B2 | 12/2010 | Mueller et al. |
| 7,973,642 B2 | 7/2011 | Schackmuth et al. |
| 8,091,543 B2 | 1/2012 | Baumann et al. |
| 8,193,474 B2 | 6/2012 | Harris |
| 8,426,777 B2 | 4/2013 | Elston et al. |
| 8,555,776 B2 | 10/2013 | Debord et al. |
| 8,766,144 B2 | 7/2014 | Mcloughlin et al. |
| 8,931,400 B1 | 1/2015 | Allen |
| 9,017,751 B2 | 4/2015 | Rauh |
| 9,041,799 B2 | 5/2015 | Bielstein |
| 9,069,340 B2 | 6/2015 | Minvielle |
| 9,149,058 B2 | 10/2015 | Bilet et al. |
| 9,204,754 B1 | 12/2015 | Bourgeois |
| D750,419 S | 3/2016 | Hu |
| 9,414,444 B2 | 8/2016 | Libman et al. |
| 9,460,633 B2 | 10/2016 | Minvielle |
| 9,494,322 B2 | 11/2016 | Luckhardt et al. |
| 9,528,972 B2 | 12/2016 | Minvielle |
| 9,564,064 B2 | 2/2017 | Minvielle |
| 9,644,847 B2 | 5/2017 | Bhogal et al. |
| 9,707,562 B2 | 7/2017 | Handique et al. |
| D796,895 S | 9/2017 | Blaise |
| 9,933,166 B2 | 4/2018 | Matarazzi et al. |
| D817,068 S | 5/2018 | Eades et al. |
| D821,804 S | 7/2018 | Wessels |
| 10,024,736 B2 | 7/2018 | Nivala et al. |
| 10,057,946 B2 | 8/2018 | Mills et al. |
| 10,092,129 B2 | 10/2018 | Jenkins et al. |
| 10,559,186 B2 | 2/2020 | Allen |
| D887,198 S | 6/2020 | Zhao et al. |
| 11,022,321 B1 | 6/2021 | Bhogal et al. |
| D978,600 S | 2/2023 | Bhogal et al. |
| 2002/0005406 A1 | 1/2002 | Fukunaga et al. |
| 2003/0047553 A1 | 3/2003 | Patti et al. |
| 2003/0139843 A1 | 7/2003 | Hu et al. |
| 2005/0046584 A1 | 3/2005 | Breed |
| 2005/0193901 A1 | 9/2005 | Buehler |
| 2005/0211104 A1 | 9/2005 | Harris et al. |
| 2006/0185523 A1 | 8/2006 | Wiedemann et al. |
| 2006/0218057 A1 | 9/2006 | Fitzpatrick et al. |
| 2007/0001012 A1 | 1/2007 | Kim et al. |
| 2007/0007279 A1 | 1/2007 | Chun et al. |
| 2007/0029306 A1 | 2/2007 | Chun et al. |
| 2007/0042091 A1 | 2/2007 | Rund et al. |
| 2007/0215599 A1 | 9/2007 | Kahler |
| 2008/0029078 A1 | 2/2008 | Baumann et al. |
| 2008/0032018 A1 | 2/2008 | Garniss et al. |
| 2008/0043809 A1 | 2/2008 | Herbert |
| 2008/0110999 A1 | 5/2008 | Jerovsek |
| 2008/0120188 A1 | 5/2008 | Mobley et al. |
| 2008/0193614 A1 | 8/2008 | Greiner et al. |
| 2008/0274240 A1 | 11/2008 | Germouni et al. |
| 2009/0134151 A1 | 5/2009 | Bogatin et al. |
| 2009/0274805 A1 | 11/2009 | Schonemann |
| 2010/0006558 A1 | 1/2010 | Mcloughlin et al. |
| 2010/0021606 A1 | 1/2010 | Rauh |
| 2010/0134620 A1 | 6/2010 | Bielstein |
| 2010/0138075 A1 | 6/2010 | Boer et al. |
| 2010/0145483 A1 | 6/2010 | Mcgonagle et al. |
| 2010/0147823 A1 | 6/2010 | Anderson et al. |
| 2010/0320189 A1 | 12/2010 | Buchheit |
| 2011/0002677 A1 | 1/2011 | Cochran et al. |
| 2011/0081471 A1 | 4/2011 | Mclemore et al. |
| 2011/0123689 A1 | 5/2011 | Luckhardt et al. |
| 2011/0127252 A1 | 6/2011 | Yu et al. |
| 2011/0284518 A1 | 11/2011 | Elston et al. |
| 2012/0017882 A1 | 1/2012 | Kitaguchi et al. |
| 2012/0027904 A1 | 2/2012 | Lim |
| 2012/0038549 A1 | 2/2012 | Mandella et al. |
| 2012/0076351 A1 | 3/2012 | Yoon et al. |
| 2012/0099761 A1 | 4/2012 | Yoon et al. |
| 2012/0100269 A1 | 4/2012 | Polt |
| 2012/0125921 A1 | 5/2012 | Shim et al. |
| 2012/0170247 A1 | 7/2012 | Do |
| 2012/0241445 A1 | 9/2012 | Shim et al. |
| 2012/0288595 A1 | 11/2012 | Randall et al. |
| 2013/0052310 A1 | 2/2013 | Stanford |
| 2013/0084369 A1 | 4/2013 | Smrke |
| 2013/0092680 A1 | 4/2013 | Cartwright et al. |
| 2013/0092682 A1 | 4/2013 | Mills et al. |
| 2013/0112683 A1 | 5/2013 | Hegedis et al. |
| 2013/0171304 A1 | 7/2013 | Huntley |
| 2013/0176116 A1 | 7/2013 | Jung et al. |
| 2013/0186887 A1 | 7/2013 | Hallgren et al. |
| 2013/0206752 A1 | 8/2013 | Moon et al. |
| 2013/0269539 A1 | 10/2013 | Polt |
| 2013/0277353 A1 | 10/2013 | Joseph et al. |
| 2013/0284728 A1 | 10/2013 | Moon et al. |
| 2013/0302483 A1 | 11/2013 | Riefenstein |
| 2013/0306052 A1 | 11/2013 | Price et al. |
| 2013/0306627 A1 | 11/2013 | Libman et al. |
| 2014/0026762 A1 | 1/2014 | Riefenstein |
| 2014/0086274 A1 | 3/2014 | Henke |
| 2014/0190961 A1 | 7/2014 | Kanzaki et al. |
| 2014/0199455 A1 | 7/2014 | Bilet et al. |
| 2014/0203012 A1 | 7/2014 | Corona et al. |
| 2014/0242227 A1 | 8/2014 | Yang et al. |
| 2014/0297467 A1 | 10/2014 | Soller et al. |
| 2015/0037472 A1 | 2/2015 | Fung et al. |
| 2015/0056344 A1 | 2/2015 | Luckhardt |
| 2015/0136760 A1 | 5/2015 | Lima et al. |
| 2015/0285513 A1 | 10/2015 | Matarazzi et al. |
| 2015/0289324 A1 | 10/2015 | Rober et al. |
| 2015/0292749 A1 | 10/2015 | Kim et al. |
| 2015/0324074 A1 | 11/2015 | Van Winkle |
| 2016/0098465 A1 | 4/2016 | Wu et al. |
| 2016/0242240 A1 | 8/2016 | Lee et al. |
| 2016/0278563 A1 | 9/2016 | Choudhary |
| 2016/0283822 A1 | 9/2016 | Imai et al. |
| 2016/0296055 A1 | 10/2016 | Schilling |
| 2016/0302265 A1 | 10/2016 | Kreiner |
| 2017/0011649 A1 | 1/2017 | Lee et al. |
| 2017/0074522 A1 | 3/2017 | Cheng |
| 2017/0116661 A1 | 4/2017 | Sundaram |
| 2017/0132950 A1 | 5/2017 | Harrison |
| 2017/0150842 A1 | 6/2017 | Young et al. |
| 2017/0224161 A1 | 8/2017 | Li et al. |
| 2017/0332841 A1 | 11/2017 | Reischmann |
| 2018/0101608 A1 | 4/2018 | Thysell |

(56) References Cited

U.S. PATENT DOCUMENTS

| | | |
|---|---|---|
| 2018/0310764 A1 | 11/2018 | Rheaume |
| 2018/0324908 A1 | 11/2018 | Denker et al. |
| 2019/0110638 A1 | 4/2019 | Li et al. |
| 2019/0234617 A1 | 8/2019 | Bhogal et al. |
| 2019/0250043 A1 | 8/2019 | Wu et al. |
| 2019/0282021 A1 | 9/2019 | Dion et al. |
| 2020/0063978 A1 | 2/2020 | Erbe et al. |
| 2020/0069103 A1 | 3/2020 | Baldwin et al. |

FOREIGN PATENT DOCUMENTS

| | | |
|---|---|---|
| CN | 201353794 Y | 12/2009 |
| CN | 202392848 U | 8/2012 |
| CN | 103234228 A | 8/2013 |
| CN | 103592227 A | 2/2014 |
| CN | 104042124 A | 9/2014 |
| CN | 203914599 U | 11/2014 |
| CN | 110236408 A | 9/2019 |
| CN | 307598555 | 10/2021 |
| DE | 19828333 A1 | 12/1999 |
| DE | 202008000135 | 3/2008 |
| DE | 102008043722 A1 | 5/2010 |
| DE | 102012204229 A1 | 9/2013 |
| DE | 102017220884 A1 | 5/2019 |
| EM | 008413876-0001 | 1/2021 |
| EM | 008772339-0001 | 11/2021 |
| EP | 0298858 A1 | 1/1989 |
| EP | 0899512 A1 | 3/1999 |
| EP | 1179711 A1 | 2/2002 |
| EP | 1746350 A2 | 1/2007 |
| EP | 2149755 A1 | 2/2010 |
| EP | 2618634 A1 | 7/2013 |
| GB | 1163509 A | 9/1969 |
| GB | 1195750 A | 6/1970 |
| JP | 11-63509 | 3/1999 |
| JP | 2004187778 A | 7/2004 |
| JP | 2005276171 A | 10/2005 |
| JP | 201353794 | 3/2013 |
| WO | 2006128696 A1 | 12/2006 |
| WO | 2007022507 A2 | 2/2007 |
| WO | 2009012874 A2 | 1/2009 |
| WO | 2013167333 A1 | 11/2013 |
| WO | 2014086486 A2 | 6/2014 |
| WO | 2014086487 A1 | 6/2014 |
| WO | 2015059931 A1 | 4/2015 |

OTHER PUBLICATIONS

U.S. Appl. No. 13/059,486, filed Aug. 26, 2009, Sakane, et al.
U.S. Appl. No. 13/978,413, filed Apr. 19, 2012, Ruther.
U.S. Appl. No. 14/205,587, filed Mar. 12, 2014, Chadwick, et al.
U.S. Appl. No. 14/205,593, filed Mar. 12, 2014, Chadwick, et al.
U.S. Appl. No. 15/510,544, filed Oct. 9, 2015, Kondo, et al.
"Automated Fruit Recognition for Super Markets and Food Stores, Fraunhofer, http://www.iosb.fraunhofer.de/servlet/is/33328/, accessed online Nov. 13, 2014.".
"Electrolux launches CombiSteam Pro Smart", http://www.homeappliancesworld.com/2018/03/08/electrolux-launches-combisteam-pro-smart/, downloaded from internet on Jan. 18, 2019, 2 pages.
Chinese Office Action for Application No. 201680025497X dated Jan. 14, 2020.
Chinese Office Action for Application No. 201680025497X dated Apr. 27, 2020.
Fang, Chi et al. "Cooking Time Optimization on Given Machine Constraints and Order Constraints" Integer Programming Approach, Dec. 17, 2016.
https://www.greatgrubdelicioustreats.com/fried-egg-grilled-cheese-sandwich/; "Great Grub, Delicious Treats"; Nov. 29, 2015; download date Apr. 13, 2021; pp. 1-24.
International Search Report and Written Opinion for application No. PCT/US2020/066014 dated Mar. 12, 2021.
Karimi, Davood "Deep learning with noisy labels: exploring techniques and remedies in medical image analysis" arXiv:1912.02911v4 [cs.CV] Mar. 20, 2020.
Sun, Da-Wen; "Computer Vision Technology For Food Quality Evaluation", Second Edition, Academic Press, 2016.
European Search Report Application No. 16 790 106.5, dated Aug. 2, 2019.
Li, Xin , et al., "On-Line Temperature Estimation for Noisy Thermal Sensors Using a Smoothing Filter-Based Kalman Predictor", Sensors, 2018, 18, 433, www.mdpi.com/journal/sensors.
"Calm-Do Electric Skillet Grill Combo", Posted Aug. 30, 2022 [online], [retrieved Nov. 10, 2022]. Retrieved from internet, https://V www.amazon.com/Electric-Multi-functional-Tempered-Adjustable-Temperature/dp/BOBCDCY5ZN/ref=zg_bsnr _ 13838481 _sccl_ 28/ 137-1133164-9652034?psc=1 (Year: 2022).
"WMF Vitalis Compact", Posted Jun. 20, 2018 [online], [retrieved Nov. 10, 2022]. Retrieved from internet, https ://www.amazon.com/ WM F-Vitalis-Roaster-Si licone-Silver/dp/B00 I3YH GBG (Year: 2018).
Bhogal, Nikhil , et al., "Cooking Vessel", Design U.S. Appl. No. 29/794,417, filed Jun. 11, 2021.

(12) United States Patent

US 12,075,804 B2

SYSTEM AND METHOD FOR ESTIMATING FOODSTUFF COMPLETION TIME

CROSS-REFERENCE TO RELATED APPLICATIONS

This application is a divisional of U.S. patent application Ser. No. 17/100,046 filed 20 Nov. 2020, which claims the benefit of U.S. Provisional Application No. 62/937,996, filed 20 Nov. 2019, each of which is incorporated in its entirety by this reference.

TECHNICAL FIELD

This invention relates generally to the food preparation field, and more specifically to a new and useful system and method in the food preparation field.

BACKGROUND

Typically, during food preparation (e.g., cooking), a user or computing system sets an amount of time to cook the food for. This process can lead to nonideal food preparation such as overcooking foodstuff, undercooking foodstuff, and/or other nonidealities. Thus, there is a need in the food preparation field to create a new and useful system and method. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
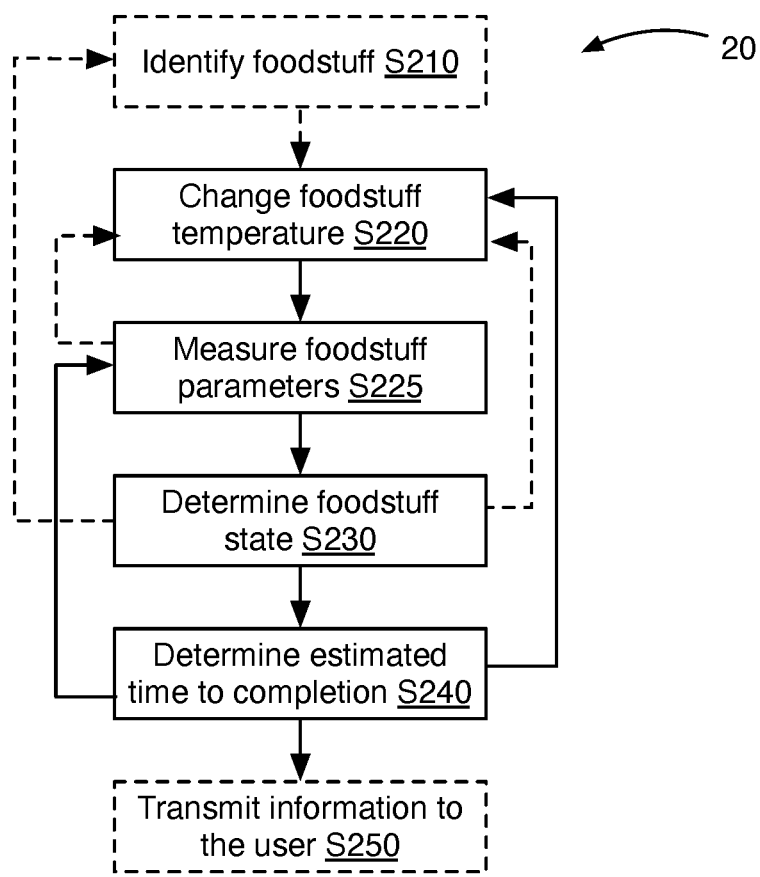
FIG. 2 is a schematic representation of the method.

As shown in FIG. 2, a method 200 can include identifying a foodstuff, changing the temperature of the foodstuff, determining the estimated time to completion, and/or any suitable steps. Determining the estimated time to completion can include determining a set of temperature curves, filtering the set of temperature measurements, transmitting information to a user, and/or any suitable steps. The method 200 preferably functions to estimate the amount of time remaining before foodstuff is finished (e.g., reaches a target temperature); however, the method can be used in any suitable manner.

Figure 1:
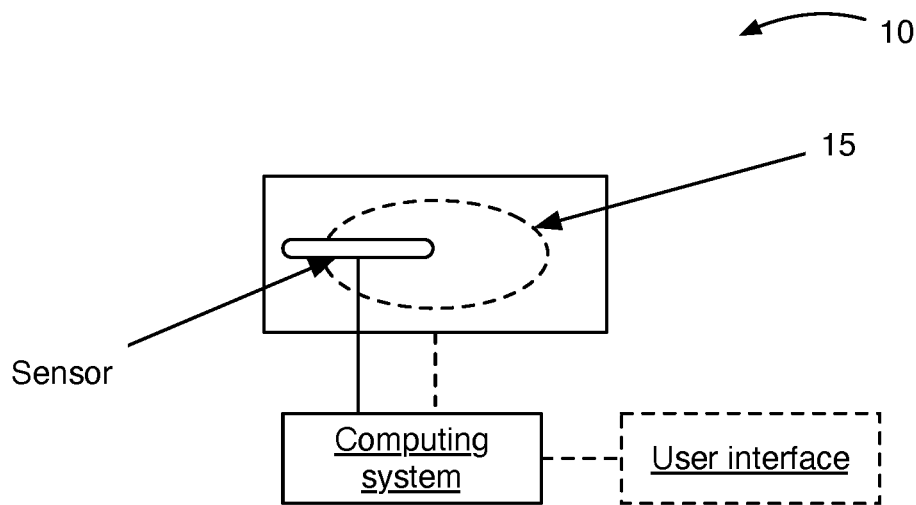
FIG. 1 is a schematic representation of the system.

As shown in FIG. 1, the method can be performed using a system including one or more: computing systems 110, foodstuff appliance, sensors, and/or any suitable components. The system is preferably configured to support (e.g., hold) and apply heat to a foodstuff; however, the system can be otherwise suitably configured. In an illustrative example, the system can be a connected oven as disclosed in U.S. patent application Ser. No. 17/014,932 filed 8 Sep. 2020 and entitled "CONNECTED FOOD PREPARATION SYSTEM AND METHOD OF USE," which is incorporated in its entirety by this reference. However, any foodstuff system and/or appliance can be used.

Embodiments of the technology preferably function to estimate when a foodstuff 15 will reach a desired state (e.g., finished temperature, target temperature, target quality, "doneness," etc.) also referred to as 'completion'; however, the technology can be used to identify when a given object and/or space has reached a target temperature, and/or can serve any suitable function. The foodstuff is preferably animal based (e.g., meats, eggs, dairy, etc.); however, embodiments of the technology can be used for any suitable foodstuff (e.g., vegetables, carbohydrates, fruits, etc.).

2. Benefits

Variations of the technology can confer several benefits and/or advantages.

Figure 5:
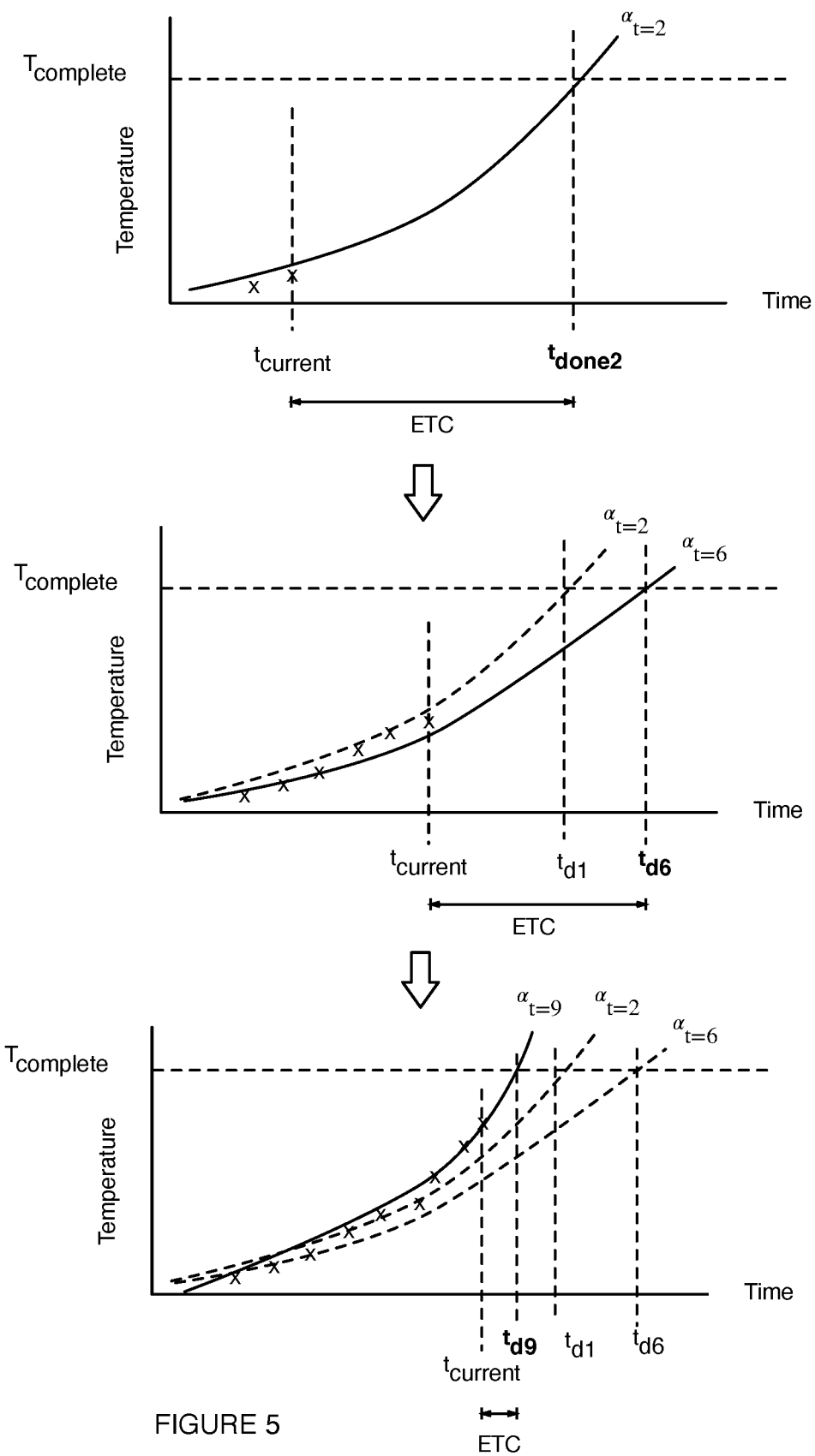
FIG. 5 is a schematic representation of iteratively determining the temperature curve and corresponding estimated time to completion (ETC) based on updated foodstuff measurements.

First, variants of the technology can provide an estimate for time until foodstuff cooking completion. Specific variants can measure the temperature for the foodstuff during cooking and update the estimated amount of time before the food will reach a target temperature. Specific examples can estimate the remaining time to foodstuff completion based on the current foodstuff temperature. In one example, as shown in FIG. 5, the method can iteratively: measure the foodstuff temperature (e.g., internal temperature) during cooking, determine the temperature curve and/or parameters thereof to use (e.g., for the timestep) based on the updated measurement (e.g., using one or more states output by a Kalman filter), determine the completion time based on the temperature curve, and update the estimated amount of time until food completion (e.g., before the food will reach a target temperature).

Figure 9:
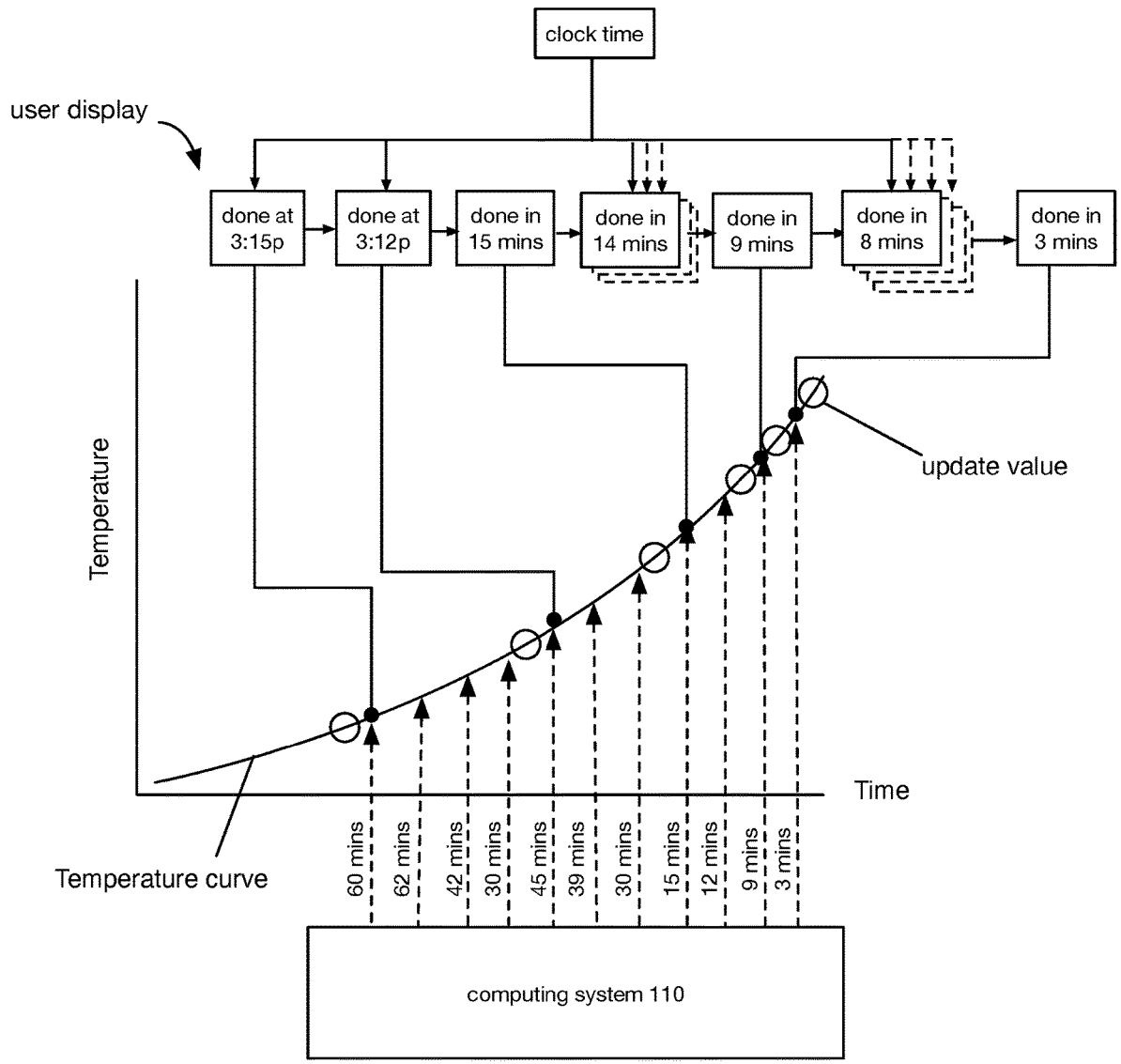
FIG. 9 is a schematic representation of an example of the derivation of the displayed information at different times in the cooking session.

Second, variants of the technology can correct for noisy data (e.g., noisy foodstuff parameter data). Specific variants can enable accurate estimates of the remaining time to completion using noisy temperature readings of the foodstuff (e.g., from low quality probes, from sensors moving within the foodstuff, etc.) by leveraging estimation techniques (e.g., a Kalman filter) to estimate the true values for inputs to the time-to-completion determination. Other variants can selectively update the remaining time estimate, and use the wall clock to count down the remaining time between estimate updates (example shown in FIG. 9).

Third, variants of the technology can be robust to changes in the temperature of a foodstuff appliance. In specific examples, the technology can generate accurate estimates of the time to completion despite changes to the foodstuff appliance (e.g., opening and closing, adding new foodstuffs to the foodstuff appliance, changing foodstuff appliance settings, etc.).

Fourth, variants of the technology can be used for any suitable foodstuff. In specific examples, the technology can estimate the amount of time until the foodstuff is cooked to a desired state for a variety of different foodstuffs such as beef, pork, fowl (e.g., duck, chicken, turkey, emu, ostrich, goose, pigeon, etc.), mutton, camel, goat, eggs, bison, rabbit, wild game, seafood, vegetables, candy, bakery (e.g., bread, cake, etc.), and/or any suitable foodstuff.

Fifth, variants of the technology can perform processing steps quickly and require minimal storage capacity. In specific examples, the technology can be configured to run efficiently on microprocessors requiring a small amount of storage and a small number of computations to perform one or more calculations. In nonlimiting examples, storage can be minimized by storing tables of coefficients (e.g., for a given curve identifier or temperature curve parameter; for a given set of temperature ranges, etc.) and/or a set of equations, instead of storing complex state spaces, multidimensional curves, and/or neural networks. In nonlimiting examples, processing power can be reduced (and/or calculation speed can be increased) by approximating the polynomial curves as a set of piecewise linear curves; this can reduce the requisite processing power because linear equations can be faster to calculate than polynomial equations.

However, variants of the technology can confer any other suitable benefits and/or advantages.

3. System

The system 10 preferably functions to perform the method, but can optionally: heat (e.g., cook) the foodstuff 15, and/or perform any suitable function. For example, the system can estimate when the foodstuff will be finished (e.g., when the foodstuff will reach a target temperature, a target doneness, etc.) and provide an estimated time to completion (ETC) (e.g., notify one or more users when the foodstuff is estimated to finish).

The foodstuff appliance 10 (e.g., cooking system, cooking appliance, foodstuff system, etc.) preferably functions to change the temperature of a foodstuff (e.g., cook foodstuff, reheat foodstuff, etc.). The cooking system can cook the food based on a set of operation instructions (e.g., operation settings), wherein the operation instructions can be: automatically determined, manually determined (e.g., set by a user), and/or otherwise determined or controlled. The cooking system is preferably configured to hold foodstuff (e.g., including on racks, on spits, etc.; with an inner volume that the foodstuff can fit inside; before cooking; during cooking; while the foodstuff is resting; etc.). The cooking system preferably includes one or more heating elements. The heating elements can be arranged above, below, beside, insertable into, a combination of the above locations, and/or in any suitable position relative to at least part of the foodstuff (e.g., a cavity where foodstuff is placed within the cavity). Example heating elements can include: heaters (e.g., resistive heaters), magnetrons, burners, conductive heating elements, inductive heating elements, and/or any other suitable heating element. The cooking system can optionally include one or more cooling elements (e.g., to keep foodstuff cold until the foodstuff is ready to be cooked, to preserve the food after cooking is complete, etc.). The cooking system can apply direct heat (e.g., such as via conduction; heating element is in contact with the foodstuff) and/or indirect heat (e.g., such as via convection, radiation; heating element is not in contact with the foodstuff) to foodstuff. The heat can be constant and/or variable. In specific examples, the cooking system can be an oven, a range (e.g., gas, electric, etc.), a microwave, a pressure cooker, a rotisserie, a fryer, a toaster, a fire, a grill, a sous vide, and/or any suitable cooking system can be used.

The foodstuff appliance is preferably connected (e.g., via a wired or wireless connection) to the computing system, but can additionally or alternatively be connected to the user interface, the sensors, and/or any other suitable component.

The computing system 110 preferably functions to process sensor data to determine an estimated time to foodstuff completion. However, the computing system can additionally or alternatively perform any other suitable function. In variants, the computing system can perform calculations (e.g., determine temperature curves, determine the amount of time until foodstuff is cooked, etc.), transmit information (e.g., to the user such as via the user interface), control the cooking system operation, and/or perform any suitable function. The computing system is preferably integrated into the cooking system (e.g., mounted to a housing shared by the computing system and the cooking system); however, the computing system can be remote (e.g., a server, a cloud, etc.), distributed, and/or arranged in any suitable manner. In variants where the computing system shares a housing with the cooking system, the computing system is preferably mounted to an external surface of the cooking system, but can be mounted to an internal surface of the cooking system and/or otherwise be integrated into the cooking system.

When the computing system is remote from the cooking system, the computing system can additionally receive foodstuff measurements transmitted from the cooking system(s) (e.g., via a wired or wireless connection). The computing system is preferably coupled (e.g., wired, wirelessly) to the user interface. The computing system preferably includes one or more processors and memory; however, the computing system can include any suitable components. Examples of processors that can be used include: microprocessors, ASICs, CPUs, GPUs, TPUs, and/or any other suitable processing system. Examples of memory that can be used include: flash, RAM, or any other suitable digital or analog memory. In specific examples, the microprocessor(s) are configured to efficiently perform multiplication, addition, and search operations; however, the computing system can be configured in any suitable manner.

The computing system is preferably operable to process the sensor data to determine a foodstuff state. The foodstuff state preferably includes a (current and/or estimated) foodstuff parameter and a (current) temperature curve parameter. However, the foodstuff state can additionally or alternatively include a cooking system state, an error estimate for the current foodstuff parameter, an error for the temperature curve parameter, a previous foodstuff parameter, a future foodstuff parameter, a previous temperature curve parameter, a future temperature curve parameter, and/or any suitable information. The foodstuff state is preferably determined using a state estimator. Examples of state estimators can include a Kalman filter, a modified Kalman filter (e.g., a Kalman filter where the state transition model is modified to reflect or based on a temperature curve form), an extended Kalman filter, a particle filter, Monte Carlo, Benes filter, machine learning, neural networks, and/or any suitable state estimator. However, the foodstuff state can be otherwise determined. Inputs to the state estimator can include: a previous foodstuff state (e.g., only an immediately previous foodstuff state, an initial foodstuff state, foodstuff states estimated prior to the current time, etc.), a measured foodstuff parameter, a state-transition model, an observation model, covariance of noise (e.g., process noise, observation noise), and/or any suitable inputs. The computing system preferably only retains the current foodstuff state (e.g., at time t) and an immediately prior foodstuff state (e.g., at time t−1). When a new foodstuff parameter is measured (e.g., at time t+1) and/or a new foodstuff state is determined, the prior foodstuff state can be removed (e.g., deleted from memory, overwritten, etc.) and/or otherwise modified. However, the computing system can retain all prior foodstuff states, a predetermined number of foodstuff states, and/or any suitable foodstuff states.

In some variants, the foodstuff states can be combined (e.g., stitched together) to form a foodstuff parameter profile (e.g., a temperature profile) that relates the foodstuff parameter to time.

The computing system 110 preferably functions to store and/or receive a temperature curve database 115 (e.g., a temperature curve database) including one or more temperature curves that can be used to determine the estimated time to completion. The temperature curves can depend on the foodstuff identity (e.g., a different database of temperature curves for different classes or types of foodstuff, a different subset of temperature curves within a database associated with a different class or type of foodstuff, etc.) and/or be universal (e.g., the same set of temperature curves can be used for all foodstuff, the same set of temperature curves can be used for two or more types or classes of foodstuff, etc.).

The temperature curves (e.g., cooking curves, heating curves, cooling curves, etc.) are preferably a set of one or more curves that define a relationship between foodstuff temperature (e.g., past foodstuff temperature, current foodstuff temperature, future foodstuff temperature, measured foodstuff temperature, estimated foodstuff temperature, etc.) and time (e.g., that foodstuff is cooking, that foodstuff is predicted to cook for, etc.). The method preferably selects a different temperature curve set (set of temperature curves) for each foodstuff type or foodstuff class (e.g., white meat chicken, dark meat chicken, steak, ground beef, etc.), but can additionally or alternatively select the set of temperature curves based on: foodstuff size (e.g., weight, thickness, shape, etc.), foodstuff composition (e.g., fat, muscle, collagen, fiber, bone, etc.), cooking system (e.g., type), cooking system parameters (e.g., temperature; size; fill percentage; thermal properties such as heat capacity, emissivity, etc.; appliance state, such as open, closed, convection, broil, etc.; etc.), initial foodstuff temperature, target foodstuff temperature, reference foodstuff temperature, foodstuff temperature trajectory, foodstuff temperature change over time, foodstuff probe (e.g., location of foodstuff probe such as relative to foodstuff such as center, surface, depth; thermocouple size; etc.), and/or any suitable parameter. The temperature curves can be raw (e.g., unprocessed data such as the temperature profile) and/or processed (e.g., smoothed, fit, denoised, scaled, etc.).

Each temperature curve set preferably includes one or more temperature curves. Each temperature curve of the set of temperature curves is preferably associated with a single temperature curve identifier or parameter (e.g., temperature curve parameter, '$\alpha$,' such as a different value of $\alpha$ for each temperature curve); however, each temperature curve can correspond to more than one parameter. $\alpha$ is preferably inversely proportional to temperature; however, $\alpha$ can be directly proportional to temperature, independent of temperature, be related to the cooking rate, be related to the foodstuff thickness, be related to the foodstuff heat transmissivity, and/or have any suitable relationship to temperature. During cooking, foodstuff can remain on a single temperature curve, switch between temperature curves, and/or follow more than one temperature curve.

Each temperature curve within the temperature curve set is preferably a piecewise smooth function (e.g., piecewise linear functions, piecewise quadratic, piecewise polynomial, formed from a set of linear functions that are defined over a number of temperature or time intervals of equal or varying size, etc.), but can additionally or alternatively be: piecewise continuous, piecewise functions, linear, nonlinear (e.g., be a polynomial function, an exponential function, a logarithmic function, splines, rational functions, logistic functions, hyperbolic functions, sinusoidal functions, Bessel functions, sigmoid functions, etc.), a combination thereof, and/or otherwise constructed.

In specific variants, each temperature curve can be split into a set of temperature windows (e.g., temperature ranges). The temperature windows (e.g., number, size, starting temperature, etc.) can be determined heuristically, using a machine learning algorithm (e.g., neural networks), using an optimized parameter search, manually, and/or can be chosen in any suitable manner. Each temperature window is preferably independent of the other temperature windows; however, any temperature window can depend on the other temperature windows. The temperature windows are preferably nonoverlapping; however, any temperature windows can overlap other temperature windows. The temperature windows are preferably different for each temperature curve (e.g., within a set, across sets); however, the temperature windows can be shared across temperature curves. In a specific example, the temperature curve can be divided into temperature windows corresponding to temperatures: less than −18° C., −18° C. to 4° C., 4° C. to 25° C., 25° C. to 45° C., 45° C. to 55° C., 55° C. to 60° C., 60° C. to 65° C., 65° C. to 70° C., 70° C. and above. However, any suitable number and ranges for temperature windows can be used. In a specific example, each temperature curve can be a set of linear functions (e.g., piecewise smooth functions) having the functional form: $t = C_T + D \cdot (1/\alpha)$, where t is the time (e.g., time relative to the initial time, instantaneous time, etc.), where $C_T = a_0 + a_1 \cdot T + a_2 \cdot T^2$ and $D_T = a_0 + a_1 \cdot T + a_2 \cdot T^2$, where T is the temperature (e.g., instantaneous temperature, initial temperature for the temperature window, final temperature within the temperature window, mean temperature for the temperature window, median temperature for the temperature window, temperature relative to the initial temperature, etc.), and $a_0$, $a_1$, $a_2$, $b_0$, $b_1$, $b_2$, are fit parameters associated with a temperature window. However, the temperature curves can be configured in any suitable manner.

The sensor preferably functions to measure foodstuff parameters. The computing system can be connected (e.g., via a wired or wireless connection) to one or more sensors. Each cooking system can be connected to or include one or more sensors. The sensor can optionally be connected to one or more dataloggers that function to store the timeseries of sensor data. The foodstuff parameter is preferably the current foodstuff temperature (e.g., at the center of the foodstuff, at the surface of the foodstuff, etc.); however, the foodstuff parameter can include the foodstuff identity (e.g., type of foodstuff such as animal, cut, variety, etc.), the size of the foodstuff, a time parameter (e.g., how long has the foodstuff been in the cooking system, how long has the foodstuff been cooking, etc.), weight of the foodstuff, foodstuff composition (e.g., amount of fat, bone, collagen, etc.; distribution of fat, bone, collagen, etc.; etc.), foodstuff color (e.g., browning and/or blackening, caramelization, etc.), foodstuff optical characteristics (e.g., an image of the foodstuff), foodstuff noise (e.g., amplitude, frequency, frequency spectrum, etc.), and/or any suitable foodstuff parameter. The sensor is preferably configured to interface with the foodstuff before, during, and after cooking (e.g., inserted into the foodstuff, attached to the foodstuff surface, line of sight to the foodstuff, foodstuff on top of the sensor, etc.), but can interface with the foodstuff at any suitable time(s). The sensor is preferably coupled (either directly or indirectly) to the computing system and, optionally, to the user interface.

The sensor 120 is preferably a foodstuff probe, more preferably a thermometer 125; however, the sensor can additionally or alternatively include one or more of: an optical sensor (e.g., a camera, an infrared camera, infrared temperature probe, Raman temperature probe, etc.), an acoustic sensor (e.g., microphone), a spectroscopic sensor (e.g., colorimetric, gas chromatography, mass spectrometer, etc.), an electronic nose, a pressure sensor (e.g., scale), a timer, a cooking system sensor (e.g., detect cooking system opening and closing, detect amount of time cooking system remains open, etc.), structural sensor (e.g., structured light, etc.), and/or any suitable sensor or set thereof. In a specific example, the sensor can be a thermometer (e.g., thermocouple) that is inserted into the foodstuff (e.g., center of the foodstuff; near a foodstuff feature such as bones, fat, etc.; supported within the foodstuff such that it does not move; etc.). However, the sensor can be a surface thermometer, a cooking cavity thermometer, and/or any suitable sensor. The same sensor is preferably used for different foodstuff; however, a different sensor can be used for each foodstuff (e.g., type of foodstuff, size of foodstuff, foodstuff identity, etc.).

The sensor can sample the foodstuff parameter at predetermined times, at a predetermined frequency, responsive to a trigger (e.g., a request to measure the foodstuff parameter), at random times, at a timing the depends on the foodstuff parameter, with a timing that depends on the target foodstuff parameter, and/or with any suitable timing.

The user interface 130 preferably functions to communicate with a user (e.g., receive inputs such as foodstuff identification, foodstuff preferences such as doneness, target temperature, etc. from a user; send outputs to a user such a foodstuff temperature, estimated time to foodstuff completion, etc.; etc.). The user interface is preferably attached to the cooking system (e.g., on an outside surface of the cooking system), but can additionally or alternatively be connected to (e.g., mounted to, communicably connected to) the computing system, an auxiliary system, a user device (e.g., a smartphone, a tablet, etc.), or otherwise configured. The user interface can include one or more: touchscreens, knobs, dials, displays, buttons, applications (e.g., on a user device such as a smart phone, mobile phone, computer, etc.), speakers, and/or any other suitable user interface. In a first example, the user interface is a touchscreen mounted to a door of the appliance. In a second example, the user interface is an application executing on a user's mobile device (e.g., smartphone). In a third example, the user interface is mechanically and electrically connected to the temperature probe, and can be separate from or integrated within the appliance.

However, the system can additionally or alternatively include any other suitable component or set thereof.

4. Method

Figure 8:
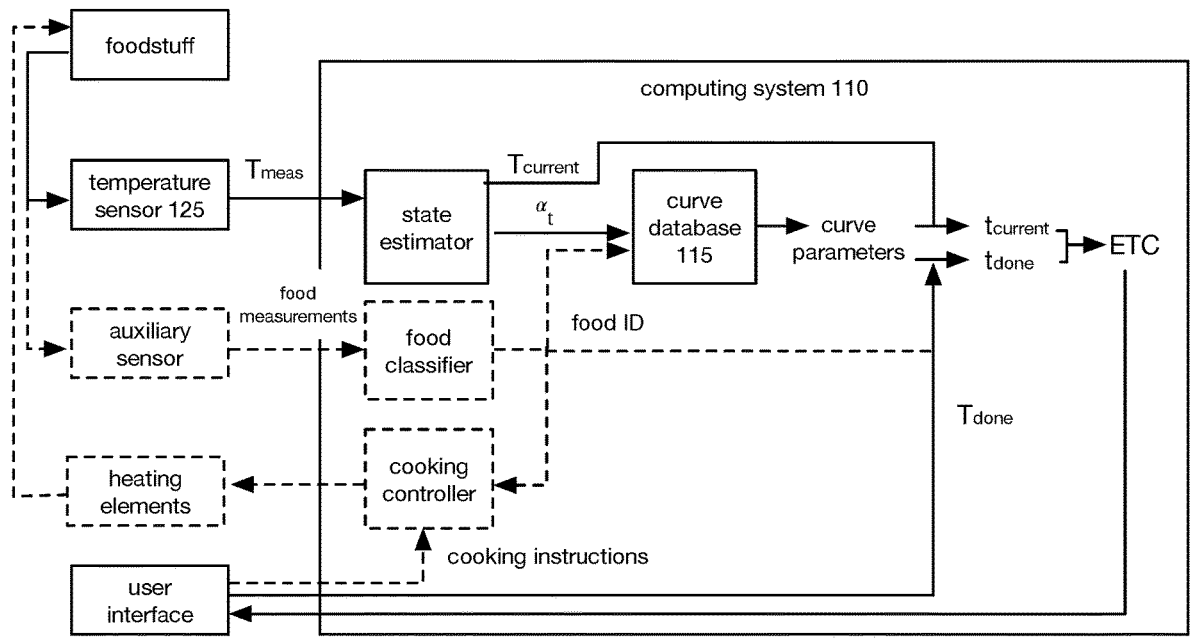
FIG. 8 is a schematic representation of an example of the system.

The method 200 preferably functions to estimate the time to completion (ETC) for a foodstuff cooking session (e.g., ETC until foodstuff cooking completion). Completion can be associated with (e.g., determined based on achieving) a target temperature, a target doneness, a target color, a target sound, a target texture, a target time (e.g., a target amount of time that the foodstuff is maintained at, above, or below a threshold temperature), and/or based on any suitable metrics of the foodstuff. Completion can be a predetermined value (e.g., a target temperature based on a foodstuff, a setting as selected by a chef, etc.), a user preference (e.g., a stored user preference such as a preferred doneness for a steak of rare, medium rare, medium, medium well, or well done, etc.), a user selection (e.g., a selection input by the user, example shown in FIG. 8), a value based on the foodstuff identity, and/or be otherwise identified. The method is preferably performed by a system such as a system described above, but can additionally or alternatively be performed by any system.

The method can include identifying a foodstuff S210, changing a foodstuff temperature S220, determining a temperature curve S230, determining the time to foodstuff completion S240, and optionally, transmitting information to a user S250, but can additionally or alternatively include any suitable steps. The method preferably uses a set of temperature curves (e.g., predetermined temperature curves); however, the method can use any other suitable temperature curve generated manually or in any suitable manner. The method and/or steps associated with the method are preferably performed automatically; however, the method can be performed semi-automatically, manually, and/or in any suitable manner. The method (and/or any suitable steps associated with the method) can be performed at: a predetermined frequency (e.g., 1 ms, 10 ms, 100 ms, 1 s, 10 s, 30 s, 1 min, 2 min, 5 min, 10 min, etc.), at predetermined temperature intervals (e.g., 0.1° C., 0.5° C., 1° C., 2° C., 5° C., 10° C., 20° C., 50° C., etc.), in response to new sample measurement receipt, for each measurement timestep, for every N measurements or timesteps, performed with variable frequency, performed once, performed with random timing, and/or performed with any suitable timing.

The estimated time to completion (ETC) is preferably an estimate of the amount of time until the foodstuff is finished cooking (e.g., when the foodstuff will reach a target temperature, when the foodstuff will reach a target temperature range, when the foodstuff will be safe to eat, when the foodstuff will reach a target doneness, etc.); however, the ETC can be a minimum amount of time before the foodstuff will be finished cooking (e.g., 15 min, 30 min, 45 min, 1 hour, 2 hours, etc.), an estimated amount of time to reach a temperature below the target temperature (e.g., to account for resting, to alert the user that the food is nearly ready, based on user statistics such as how close to foodstuff completion they normally remove the foodstuff from the cooking system, etc.), a maximum amount of time to completion, and/or any suitable time. In a specific example, if the estimated time to completion is greater than a threshold duration (e.g., one hour), the estimated time to completion can be "at least one hour;" however, the ETC can be any suitable amount of time.

The ETC can be a specific time (e.g., a wall clock time, such as 08:05, 08:07, 09:11, 09:00, 19:02, 18:58, etc.), a duration (e.g., 1 s, 2 s, 5 s, 10 s, 30 s, 1 min, 2 min, 5 min, 10 min, 15 min, 30 min, 45 min, 1 hour, 2 hours, 4 hours, 8 hours, etc.), an estimated duration (e.g., to the nearest minute, to the nearest second, to the nearest 5 minutes, to the nearest 10 minutes, to the nearest 30 seconds, to the nearest hour, etc.), an estimated time (e.g., 17:00, 17:05, 17:10, 17:15, etc.), and/or any suitable time and/or timespan.

The ETC is preferably based on the target foodstuff parameter (e.g., final temperature); however, the ETC can be based on a target doneness (e.g., blue rare, rare, medium rare, medium, medium well, well done, etc.), target temperature change from an initial foodstuff temperature, texture (e.g., firmness, flakiness, crunchiness, etc.), appearance (e.g., color), weight, mass, past foodstuff parameter(s), cooking system settings, amount of time (e.g., amount of time the foodstuff has been in the cooking system), and/or any suitable parameters (e.g., foodstuff parameters). The accuracy of the ETC preferably improves as the cooking time progresses; however, the accuracy of the ETC can be independent of cooking time, and/or be related to cooking time in any suitable manner. In a specific example, the ETC is the difference in time between the instantaneous time and the predicted time for the food stuff to reach a target temperature; however, the ETC can be determined in any suitable manner. A cooking session can have one or more ETC. In an illustrative example, a cooking session can include an a first ETC associated with an estimated time to interact with the foodstuff (e.g., flip the foodstuff, wrap the foodstuff, season the foodstuff, add one or more ingredients, etc.) and a second ETC associated with an estimated time to foodstuff doneness. However, a cooking session (and/or foodstuff) can have any suitable number of ETCs (e.g., intermediate ETC, final ETC).

The ETC (e.g., the ETC displayed to the user) can be updated when a new ETC is calculated, at a predetermined frequency, when the foodstuff parameter reaches a predetermined foodstuff parameter (e.g., an update temperature threshold, an update time threshold, etc.), according to a timer (e.g., a countdown timer), after a predetermined number of ETC updates, when the ETC changes by a threshold time change, after N ETC estimates within a time window agree, after the next checkpoint in the temperature curve is passed (e.g., next temperature checkpoint), and/or with any suitable timing.

In some embodiments, the method and/or steps thereof can include and/or be performed as disclosed in U.S. patent application Ser. No. 16/380,894 filed 10 Apr. 2019 entitled 'CONNECTED FOOD PREPARATION SYSTEM AND METHOD OF USE', which is incorporated in its entirety by this reference. However, the method and/or steps thereof can be performed in any suitable manner.

4.1 Identifying the Foodstuff

Identifying the foodstuff S210 preferably functions to determine what foodstuff is present in the cooking system (e.g., meat such as animal, type, cut, etc.; vegetable; bakery; etc.). Identifying the foodstuff preferably occurs before changing the foodstuff temperature; however, identifying the foodstuff can occur at the same time as and/or after changing the foodstuff temperature. Identifying the foodstuff can be performed manually (e.g., by a user at a user interface), semi-automatically (e.g., user confirms foodstuff identity selected by the computing system), and/or automatically (e.g., using computer vision, using one or more sensors, using the temperature measurements, etc.). Identifying the foodstuff can optionally include determining foodstuff parameters (e.g., size, mass, shape, number of pieces of foodstuff, foodstuff orientation such as relative to heating elements, etc.).

In a first example, identifying the foodstuff can be performed as disclosed in U.S. patent application Ser. No. 17/014,932 filed 8 Sep. 2020 and entitled "CONNECTED FOOD PREPARATION SYSTEM AND METHOD OF USE," which is incorporated in its entirety by this reference.

In a second example, the foodstuff can be identified by classifying an image of the foodstuff.

In a third example, S210 can be performed after S220, S230, S240, and/or at any suitable timing. In these variants, the temperature curve that the foodstuff is following and/or the set of foodstuff curves that the foodstuff temperature is following can be used to identify and/or refine the identification of the foodstuff. For example, after determining the foodstuff state and/or temperature curves a predetermined number of times, a foodstuff identity and/or a probability that the foodstuff belongs to a specific class can be determined.

In a fourth example, S210 can be performed after several iterations of S220, S230 and/or S240. This example can include: comparing the history of temperature measurements for the cooking session against the temperature curves associated with known foodstuff classes and identifying the foodstuff as the foodstuff class with curve(s) that best match the cook session's temperature history. The cook session's temperature history can be matched against the curves by: calculating curve parameters based on the temperature history and finding the most similar set of known curve parameters; comparing the temperature history to a set of reference temperatures for each known curve; and/or otherwise comparing the temperature history against the known curves. The most similar set of known curve parameters can be determined based on a calculated distance measure (e.g., sum of square differences, sum of absolute differences, Minkowski difference, Chebyshev distance, etc.) between the temperature history and the known temperature curves, a classification approach (e.g., machine learning based curve fitting, genetic algorithm, graph-search, neural networks, etc.), and/or otherwise determined.

However, identifying the foodstuff can be performed in any manner.

S210 preferably includes determining target foodstuff parameters (e.g., to determine when the foodstuff reaches completion). The target foodstuff parameters can be selected manually (e.g., be input by a user) and/or automatically (e.g., generated according to recipe instructions; generated based on the foodstuff identity; based on user preferences; based on a label mapping, such as "medium rare" is 130° F. to 135° F.; etc.). The target foodstuff parameters can be set once and/or changed during one or more subsequent steps of the method.

4.2 Changing Foodstuff Temperature

Changing foodstuff temperature S220 functions to heat (and/or cool) one or more foodstuffs to a temperature (e.g., a common temperature, a finished temperature, a target temperature, a doneness temperature, etc.). The target temperature (and/or common temperature) preferably depends on the foodstuff (e.g., foodstuff type, foodstuff identity, etc.); however, the target temperature can be a predetermined value, a selected temperature, can depend on the user (e.g., user preferences), a minimum temperature (e.g., a minimum safe temperature), a maximum temperature, a recommended temperature (e.g., a chef recommended temperature), and/or can be any suitable temperature. Changing foodstuff temperature is preferably performed by a cooking system (e.g., by operating heating and/or cooling elements, by creating an environment with an ambient temperature that differs from the food stuff temperature, etc.); however, changing foodstuff temperature can be performed by a computing system (e.g., a cooking simulation) and/or any suitable system and/or component. Changing a foodstuff temperature S220 preferably occurs before determining a set of temperature curves; however, changing a foodstuff temperature can occur at the same time as and/or after determining a set of temperature curves. Changing a foodstuff temperature S220 preferably occurs before estimating the time to completion; however, changing a foodstuff temperature can occur at the same time as and/or after estimating the remaining cook time.

Changing foodstuff temperature preferably includes cooking the foodstuff; however, changing the foodstuff temperature can include simulating cooking the foodstuff (e.g., using a computing system to estimate the temperature distribution within a foodstuff), cooking a proxy foodstuff (e.g., heating a material that has thermal properties that mimic a foodstuff), and/or any suitable substitute.

The foodstuff is preferably cooked according to a set of operating instructions (e.g., generic for the foodstuff, specific to the foodstuff's characteristics, etc.), but can additionally or alternatively be or otherwise cooked. The operating instructions can be: manually set, automatically set (e.g., by a recipe, set of cooking instructions, etc.), or otherwise determined. In a specific example of automatic cooking system control, the cooking system follows the set of operating instructions, but allows the cooking time to vary (e.g., be controlled by a user, by the method, etc.). In a second example of automatic cooking system control, the recipe can be adjusted (e.g., during the cooking session, before the cooking session, etc.) based on: the altitude, the foodstuff parameters (e.g., thickness, volume, density, starting temperature, marbling, etc.), a target temperature, a target doneness, and/or otherwise adjusted.

Cooking the foodstuff preferably includes maintaining the cooking system at substantially a constant temperature (e.g., cooking system temperature varies by <5° C., <10° C., <20° C., etc.); however, the cooking system can be operated according to any suitable temperature profile (e.g., ramp up temperature, ramp down temperature, hold temperature, etc.), the temperature of the cooking system can vary (e.g., have a variance >5° C., >10° C., >20° C., etc.; the cooking system set temperature can differ from the cooking system true temperature; etc.), the cooking system can be controlled to operate at a predetermined setting (e.g., heat output setting, such as high/low/medium; fuel consumption setting), be uncontrolled, and/or be operated in any suitable manner.

S220 preferably includes measuring foodstuff parameters S225. In some variants, the foodstuff parameters can be used to generate a foodstuff parameter profile for the cooking session (e.g., a temperature profile such as a relationship between foodstuff temperature and time). However, the measured foodstuff parameters can be used independent of each other and/or have any suitable dependence and/or relationship.

The foodstuff parameter profile can be determined for a series of one or more time windows. The duration of each time window is preferably any suitable value and/or range between 1 second to 30 minutes such as 5 minutes; however, the duration of each time window can be any suitable value or range thereof between 1 second to 1 day and/or any suitable duration. The duration of each time window can be longer than, shorter than, or the same length as the previous and/or subsequent time window. For each time window, the foodstuff parameter can be measured at a given frequency (e.g., every 1 second, 5 sec, 10 sec, 30 sec, 1 min, 5 min, 10 min, etc.), at a variable frequency, at a frequency that depends on the computing system (e.g., matched to an operation frequency), at a frequency that depends on an uncertainty (e.g., a temperature uncertainty, a sensor accuracy, etc.), and/or at any suitable frequency. The frequency of measurement in a specific time window can depend on the frequency for other time windows (e.g., previous, subsequent, etc.; such as the same frequency, greater frequency, lesser frequency, etc.), can depend on an uncertainty (e.g., sensor accuracy, estimated statistical error in measurement, etc.), and/or be determined in any suitable manner. However, the foodstuff parameter can be measured at a predetermined frequency, at a variable frequency (e.g., at a frequency that depends on the difference between the current foodstuff parameter and the target foodstuff parameter, at a frequency that depends on the current ETC, at a frequency that depends on the amount of time the food stuff has been cooking, at a frequency that depends on the recipe, at a frequency that depends on the foodstuff, etc.), responsive to a trigger (e.g., when a foodstuff parameter measurement is requested), and/or with any suitable timing.

Figure 10A:
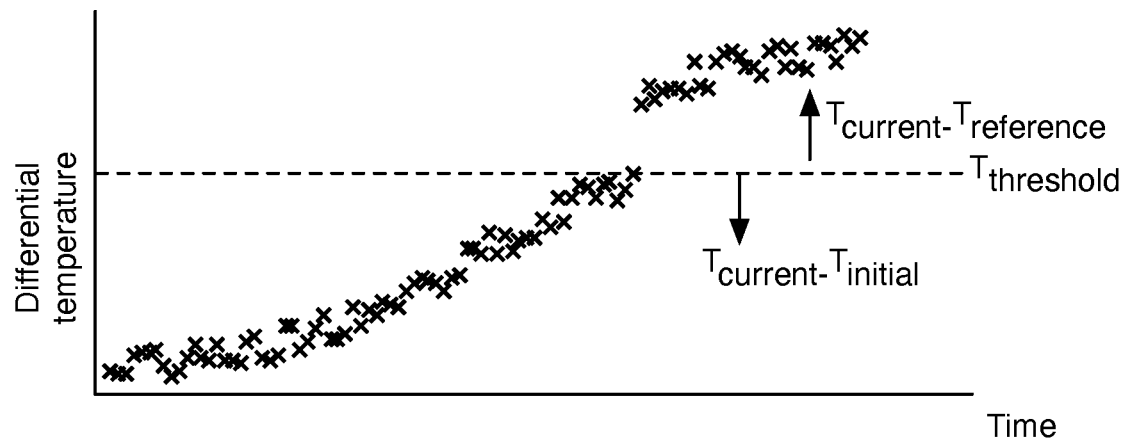
FIGS. 10A and 10B are schematic representations of examples of measured temperature profiles for foodstuff.
Figure 10B:
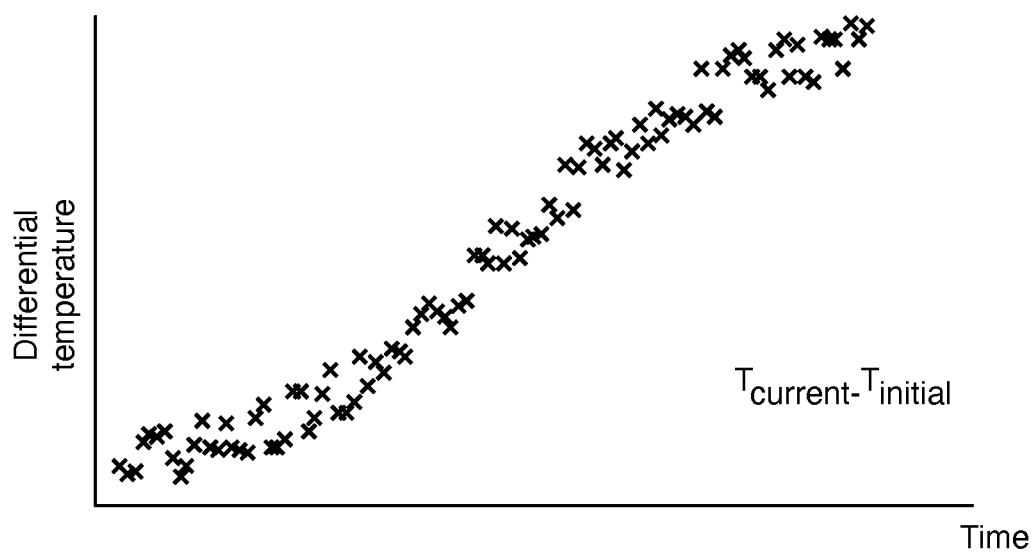

In specific variants, the measured foodstuff parameters (and/or foodstuff parameter profile) are preferably referenced (e.g., normalized) to a reference foodstuff parameter (e.g., a foodstuff parameter measured or determined at a common time such as at the starting time, at the finishing time, etc.; at a common temperature such as the starting temperature, the finished temperature, a reference temperature of the set of temperature curves, etc.; etc.), wherein the temperature curve determines normalized foodstuff parameter values; however, the measured foodstuff parameters can be raw, scaled, and/or used in any suitable manner. The reference temperature can depend on the measured foodstuff parameter and/or be independent of the measured foodstuff parameter (e.g., depend on the temperature curve set, depend on the foodstuff identifier, etc.). For example as shown in FIG. 10B, throughout a cooking session, the reference temperature can be the initial temperature of the foodstuff. In another example as shown in FIG. 10A, the reference temperature can start as the initial temperature of the foodstuff and then change to a reference temperature associated with a temperature curve. The change can occur when the foodstuff parameter exceeds a threshold foodstuff parameter, when the foodstuff parameter falls below a threshold foodstuff parameter, and/or with any timing. However, the foodstuff parameter can be otherwise determined.

In a specific example, the measured foodstuff temperature is normalized to the initial foodstuff temperature by dividing the measured foodstuff temperature by the initial foodstuff temperature. In a variation of the first specific example, the measured foodstuff temperature can be normalized to the target foodstuff temperature. In a second specific example, the measured foodstuff parameters can be referenced to the initial temperature by subtracting the initial temperature from each measured foodstuff parameter (e.g., as it is measured such as by taring or calibrating the sensor; digitally subtracting the reference temperature; etc.). In a third specific example that is particularly, but not exclusively, beneficial for foodstuff that is cooked according to a "low and slow" cooking recipe and/or requires long (e.g., greater than 1 hour, greater than 2 hour, greater than 3 hour, greater than 4 hour, greater than 6 hour, etc.) cook times, the measured foodstuff parameter can be referenced to a reference temperature associated with the foodstuff and/or recipe by subtracting a reference temperature associated with the temperature curves from the measured foodstuff parameter. In a fourth specific example, when a measured foodstuff parameter is less than or equal to a threshold foodstuff parameter (e.g., temperature, time, etc.), the measured foodstuff parameter can be referenced to the initial value of the foodstuff parameter. In the fourth specific example, when the measured foodstuff parameter is greater than or equal to the threshold foodstuff parameter, the foodstuff parameter can be referenced to a reference foodstuff parameter such as a reference foodstuff parameter associated with a temperature curve. However, the measured foodstuff parameters can be used raw, and/or processed or referenced in any suitable manner.

In variants, when an error occurs or is detected (e.g., no foodstuff parameter can be measured; temperature of the foodstuff changes in an unexpected manner such as increases faster than expected, decreases quickly, etc.; etc.), an error message can be generated for the user. However, errors can be handled in any suitable manner.

4.3 Determining a Foodstuff State

Figure 4:
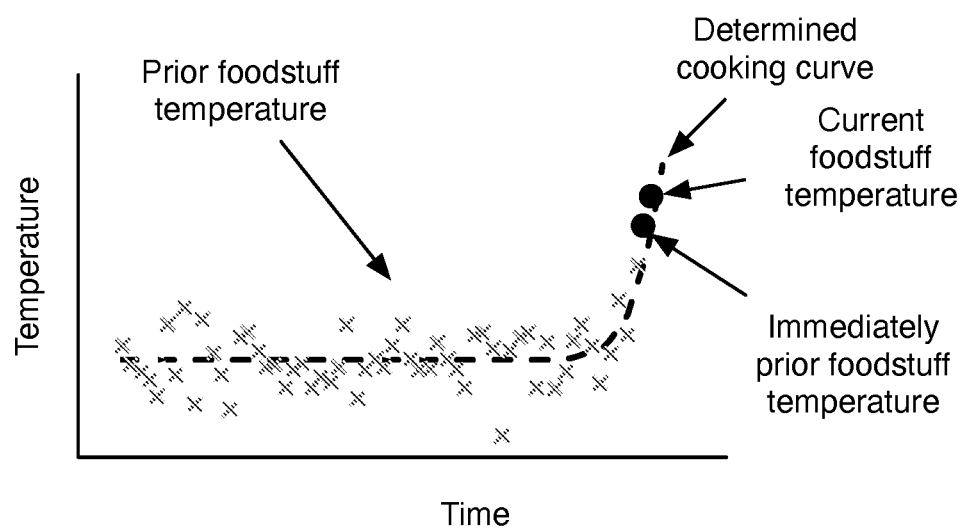
FIG. 4 is a schematic representation of an example of determining the temperature curve for a foodstuff that is being cooked.

Determining the foodstuff state S230 functions to determine the current state of the foodstuff (e.g., the state of the foodstuff associated with the measured foodstuff parameter). Determining the foodstuff state preferably occurs after measuring current foodstuff parameters; however, determining the foodstuff state can occur at the same time and/or before measuring current foodstuff parameters. Determining the foodstuff state can be performed before, during, and/or after calculating the ETC. The foodstuff state is preferably determined using a state estimator, but can be determined in any manner. The state estimator can be a Kalman filter, an extended Kalman filter, a modified Kalman filter, a particle filter, a Monte Carlo simulator, Benes filter, hidden Markov model, and/or any suitable state estimator. The inputs to the state estimator are preferably the measured foodstuff parameter(s) and/or the previous foodstuff state. For example, as shown in FIG. 4, the current foodstuff state at time t is preferably determined using the foodstuff parameter measured at time t and the foodstuff state determined for time t−1. However, the inputs to the state estimator can additionally or alternatively include a recipe, a current foodstuff appliance parameter (e.g., temperature, operation time, etc.), a history of foodstuff states (e.g., all or a subset of foodstuff states and/or foodstuff parameters going back to the initial foodstuff parameters), a foodstuff parameter profile, and/or any suitable information. The output of the state estimator is preferably the foodstuff state, but can include any suitable information.

In a first variant, S230 can include: calculating a rate of temperature change based on at least a first and second sensor measurement; determining an a based on the rate of temperature change (e.g., wherein the α can be calculated based on the rate of temperature change); and selecting the temperature curve associated with the determined α, wherein the selected temperature curve (and/or parameters thereof) can be used to estimate the ETC.

In a second variant, S230 can include: estimating the current α based on at least the measured foodstuff parameter, wherein α can be estimated as a state of the system (e.g., using a state estimator; using a filter, such as a Kalman filter; etc.). The temperature curve (and/or hyperparameters thereof) associated with the estimated current α can then be used to estimate the ETC.

In an example of the second variant, determining the foodstuff temperature curves can include filtering the measured foodstuff parameters. Filtering the measured foodstuff parameters preferably functions to reduce the noise (e.g., measurement noise, readout noise, etc.) in the measured foodstuff parameters and estimate the temperature curve parameter associated with the foodstuff; however, filtering the measured foodstuff parameters can perform any suitable function. The measured foodstuff parameters are preferably filtered in real-time (e.g., as the measurements are recorded); however, the measurements can be filtered at any suitable time. The state estimator is preferably initialized using the measured foodstuff parameter and a temperature curve parameter of 1; however, the state estimator can be initialized randomly, to a manually entered value, to a value determined based on the foodstuff class, and/or using any suitable values.

In a variation of this example, the measured foodstuff parameter is filtered using a Kalman filter; however, any suitable sensor fusion algorithm, smoothing algorithm, and/or filtering method can be used. In a specific example of this variant, a modified Kalman filter can be used. The modified Kalman filter can be defined as: $\hat{x}_k = F_k \hat{x}_{k-1}$ where $$\hat{x}_k = \begin{bmatrix} T_{current} \\ \alpha_{current} \end{bmatrix}$$

represents the true (e.g., denoised, current) temperature of the foodstuff, α is a temperature curve parameter associated with the temperature curve the foodstuff is currently estimated to be following, $\hat{x}_{k-1}$ represents the previous estimated foodstuff temperature and previous α for the prior timestep, $$F_k = \begin{bmatrix} 1 & \kappa \\ 0 & 1 \end{bmatrix}$$

represents the state transition model with κ representing a temperature rise (and/or temperature change rate). In a specific example, κ can be determined according to (and/or defined as):

$$\kappa = 1 / \left( \delta a_1 + \frac{\delta b_1}{\alpha} + 2\delta a_2 T + \frac{2\delta b_2 T}{\alpha} \right)$$

where δ is the time interval between measurements (e.g., frequency of measurements), and $a_1$, $a_2$, $b_1$, and $b_2$ are constants (e.g., global constants, constants specified by the temperature curve associated with $\alpha_{t-1}$, constants calculated based on $\alpha_{t-1}$ and/or t, constants specified by the temperature curve associated with $\alpha_t$, constants defined by the functional form of the temperature curves, etc.); however, κ can be otherwise determined. In this specific example, each new measurement can be used to update the current temperature and current α; however, each new measurement can be used in any suitable manner. In this specific example, α can be initialized to 1 (e.g., to seed the filter for the initial estimate such as for the first time point); however, α can be initialized to any suitable value. In this specific example, $T_{current}$ can be initialized to the first temperature measurement, to an ambient temperature value, to 0° C., to a reference temperature, and/or to any other suitable value. In a second specific example, κ can be determined according to (and/or defined as):

$$\kappa = \frac{\partial f}{\partial T}$$

where f(α;t) is the temperature curve corresponding to temperature curve parameter α, time t, and temperature T. However, κ can be otherwise defined and/or the measurements can be filtered in any suitable manner.

In a third specific variant, the temperature curve parameter can be determined by comparing the current foodstuff parameter measurement and a previous foodstuff parameter measurement (e.g., immediately preceding measurement, measurements within a prior time window, etc.). In a specific example, $\alpha$ can be estimated by finding the slope between the current foodstuff parameter and the previous foodstuff parameter; however, $\alpha$ and/or the current foodstuff temperature curve can be determined in any suitable manner.

Determining the foodstuff state preferably includes determining (e.g., selecting) the foodstuff parameter curve S235, which functions to determine the current foodstuff temperature curve for use in ETC calculation. The foodstuff parameter curve is preferably determined based on an analysis $\alpha$, but can be determined based on the foodstuff identifier or otherwise determined. The analysis $\alpha$ can be the current $\alpha$, a previous $\alpha$, an average or median of $\alpha$ from a prior time window or set of measurements, and/or other $\alpha$.

The foodstuff parameter curve is preferably determined (e.g., retrieved, accessed, etc.) from the foodstuff parameter curve database (and/or memory). The foodstuff parameter curve is preferably a single parameter curve, but can be a set of foodstuff parameter curves for a foodstuff class; a subset of the foodstuff parameter curves (e.g., associated with the analysis $\alpha$), and/or other curve or set thereof. The foodstuff parameter curve is preferably a temperature curve, but can alternatively be a color curve, a noise curve, size curve, weight curve, and/or any other suitable curve describing a foodstuff parameter change over time.

However, the foodstuff parameter curve can be modelled, derived, and/or otherwise determined and/or selected.

In a specific embodiment, the temperature curve is preferably the temperature curve from the set of temperature curves with a value of $\alpha$ closest to the current $\alpha$ (e.g., as determined in the foodstuff state). The closest $\alpha$ can be the $\alpha$ that has the smallest magnitude difference from the current $\alpha$, the value that the current $\alpha$ is rounded to (e.g., rounding up, rounding down, standard rounding rules, etc.), the determined value of $\alpha$ (e.g., the current $\alpha$), and/or any suitable value of $\alpha$. However, the temperature curve can be derived and/or interpolated between two or more temperature curves (e.g., when $\alpha$ is between temperature curve parameters that are stored in the database), extrapolated (e.g., when $\alpha$ is outside the range of $\alpha$ represented in the temperature curve database), be modelled, and/or otherwise be determined.

Figure 3:
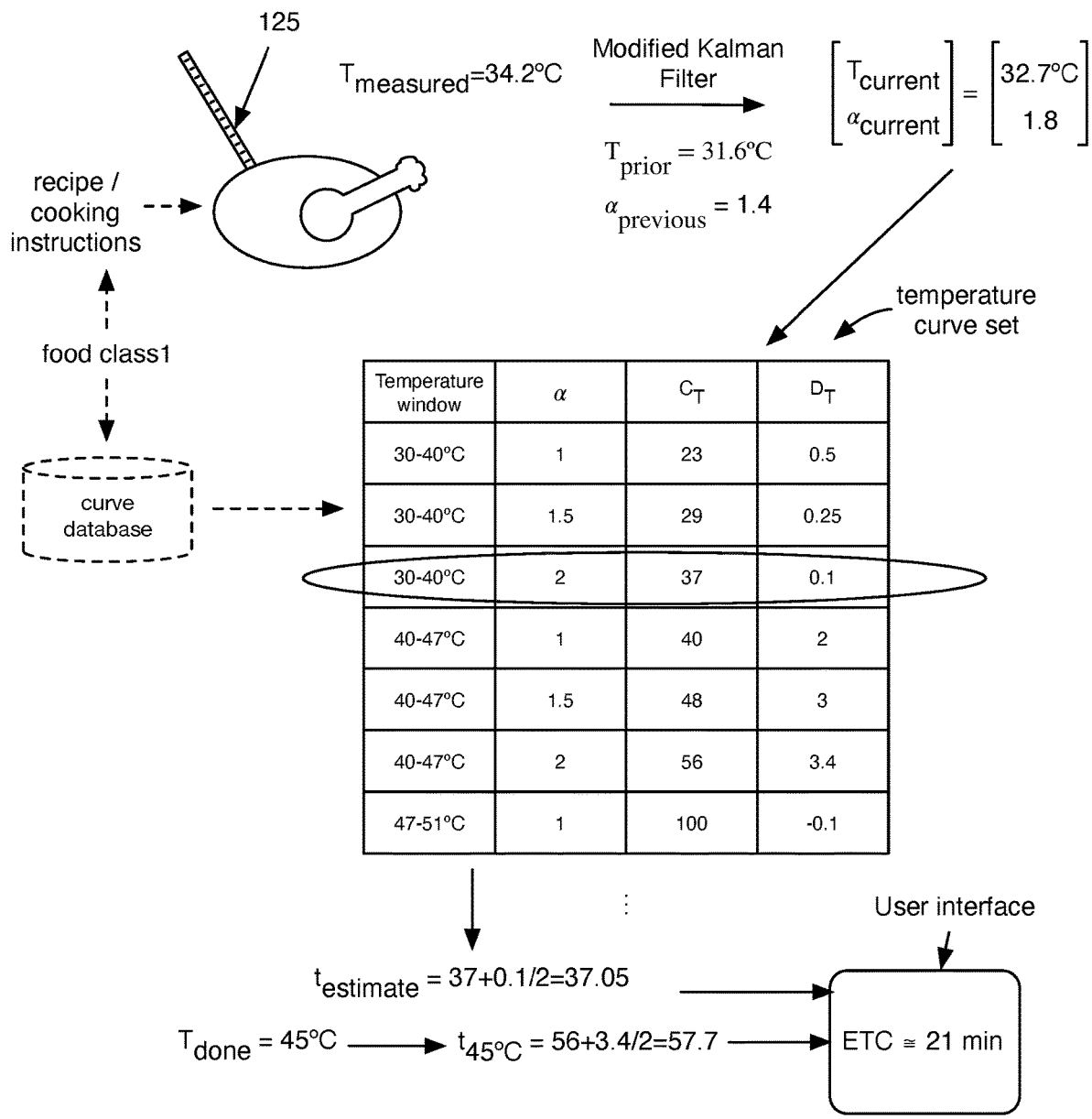
FIG. 3 is a schematic representation of an example of determining the estimated time to completion for a foodstuff.

In a specific example as shown in FIG. 3, determining the temperature curve preferably includes retrieving fit parameters (e.g., from memory, from a look-up table, etc.) associated with the current temperature and $\alpha$ (e.g., for the given foodstuff, for any foodstuff, etc.). However, the temperature curves and/or parameters thereof can be calculated (e.g., from an equation), modeled, learned (e.g., from a set of saved training data), and/or determined in any suitable manner. In a second specific example, if no temperature curve matches the value of $\alpha$, then a new temperature curve can be derived. The new temperature curve can be derived by extrapolating the existing temperature curves, interpolating between existing temperature curves, averaging, rounding $\alpha$ to the nearest existing $\alpha$ value, and/or the temperature curve can be determined in any suitable manner. In a third specific example, determining the temperature curve can include fitting the previous foodstuff temperature to a curve (e.g., a temperature curve, a piecewise smooth curve, a curve relating temperature and time, etc.). In this specific example, the previous foodstuff temperature can include measured foodstuff temperatures, previously determined foodstuff temperatures (e.g., from the modified Kalman filter), and/or any suitable previous foodstuff temperatures. In a first variation of the third specific example, the fitted curve can be used to determine the temperature curve (e.g., a fit $\alpha$, temperature profile, temperature curve identifier, etc.) that matches the temperature curve the foodstuff is following. The match can be evaluated based on residuals, based on goodness of fit statistics (e.g., sum of squares due to error, R-square, adjusted R-square, root mean square error, cosine similarity, etc.), based on the current predicted value of $\alpha$, and/or can be evaluated in any suitable manner. The fit parameters (e.g., coefficients) associated with the fit $\alpha$ can then be used to determine the estimated time to completion. In a second variation of the third specific example, the curve can be extrapolated to the completion temperature to determine the estimated time to completion. For example, the curve can be used to determine one or more parameters (such as $C_T$ and $D_T$; $a_0$, $a_1$, $a_2$, $b_0$, $b_1$, $b_2$; etc.). However, a combination of the above or any other suitable method can be used to determine the estimated time to completion based on the timeseries of temperatures for the instantaneous cooking session.

4.4 Determining the Estimated Time to Completion

Determining the estimated time to completion S240 preferably functions to estimate the amount of time (e.g., ETC) before the foodstuff reaches a target (e.g., a target temperature, a target mass, a target moisture, target doneness, etc.). Determining the ETC preferably occurs simultaneously with changing the foodstuff temperature; however, determining the ETC can occur before and/or after changing the foodstuff temperature. Determining the ETC is preferably performed by a computing system (e.g., one or more microprocessors of the computing system); however, any suitable system and/or component can be used.

The ETC can be determined (e.g., updated) for each measurement (e.g., each measurement of the foodstuff parameters); however, the ETC can be determined and/or updated for a subset of measurements (e.g., every 5, 10, 20, 30, 100, etc. measurements), at a predetermined frequency (e.g., every 1 s, 5 s, 10 s, 30 s, 60 s, 5 min, 10 min, etc.), once (e.g., at the start of cooking, once the temperature reaches a threshold temperature, etc.), responsive to a request for ETC, when a predetermined number of consecutive $\alpha$ match, and/or be determined at any suitable time.

Determining the ETC can include calculating the ETC based on the temperature curve, the current foodstuff state, the instantaneous time, and/or any suitable data. ETC is preferably calculated by subtracting an estimated completion time from the instantaneous time; however, ETC can be calculated in any suitable manner. The estimated completion time is preferably determined based on the current temperature curve. In a specific example, the foodstuff temperature curve can be determined based on $\alpha$. The estimated time for the foodstuff to reach the target temperature can be determined by assuming that the foodstuff will stay on the same temperature curve (e.g., $t_{target} = C_{Ttarget} + D_{Ttarget} * 1/\alpha_{current}$). In this example, the ETC is the time at which the foodstuff will reach the target temperature minus the current time (e.g., $t_{current} = C_{Tcurrent} + D_{Tcurrent} * 1/\alpha_{current}$, wherein $T_{current}$ and $\alpha_{current}$ are determined by the modified Kalman filter; $t_{current}$ can be the current duration of the cooking session; etc.), such that $ETC = t_{target} - t_{current}$. In a second specific example, the ETC can be determined by extrapolating from the previous foodstuff temperature. In this example, the previous (e.g., previously measured, previously determined foodstuff temperature such as from the modified Kalman filter, etc.) foodstuff temperatures can be fit to a curve (e.g., temperature curve, logistic function, exponential function, piecewise smooth function, etc.). The fit curve can be extrapolated to determine when the foodstuff will reach the completion temperature. However, the ETC can be determined in any suitable manner. In variants, the ETC can be determined in more than one manner. In these variants, the actual ETC can be selected from the ETCs based on a score (e.g., quality) of the ETC. In specific examples, an aggressive (e.g., earliest, shortest), a conservative (e.g., longest, latest), a mean (e.g., average, weighted average), a median, a most common, a highest scored (e.g., highest probability), and/or any suitable ETC can be used as the actual ETC. However, the ETC can be selected in any suitable manner.

4.5 Presenting Information to the User

Presenting information S250 functions to inform the user of the ETC, of information regarding the processing (e.g., cooking progress) of the foodstuff, of the foodstuff state, and/or otherwise functions. Transmitting information can additionally or alternatively function to transmit information such as errors, foodstuff parameters, cooking system parameters, and/or any suitable information and/or data to the user. Transmitting information to the user can include: transmitting the information to a user device; presenting the information on a user interface (e.g., of the foodstuff appliance); sending a notification to a user device; playing a notification on an audio user device; or otherwise transmitting information associated with the ETC to the user. Presenting the information to the user is preferably performed by the user interface (e.g., of the computing system, a user device, the foodstuff system, etc.); however, any suitable component can be used. Presenting information preferably occurs after determining the ETC; however, transmitting information can occur before and/or during determining the ETC.

Figure 7:
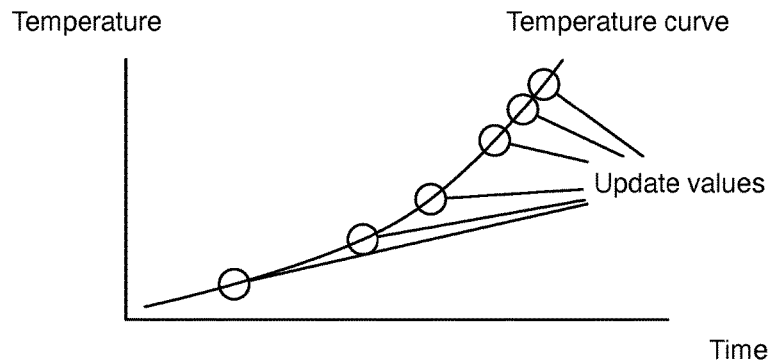
FIG. 7 is a schematic representation of an example of updating an ETC after a foodstuff parameter exceeds a threshold foodstuff parameter.

The information can include: the ETC (e.g., number of minutes, such as "15 minutes left"); clock time, such as "3:04 pm"), a minimum time until completion (e.g., "more than 1 hour left"), a maximum wait time (e.g., "less than 3 hours left"), errors, foodstuff parameters, foodstuff state, cooking system parameters, and/or any other suitable information. Information can be transmitted every time there is a change in the information (e.g., ETC updates, ETC increases, ETC decreases, etc.), every time information is determined (e.g., ETC is calculated), at a user-specified frequency, at a predetermined frequency (e.g., every 5 min, 10 min, 30 min, etc.), when a predetermined threshold is met (e.g., ETC is 5 min, 10 min, 30 min, etc.; after foodstuff has been in the cooking system for 5 min, 10 min, 30 min, etc.; after foodstuff temperature reaches a threshold value such as 30° C., 40° C., 50° C., 60° C., 70° C., 80° C., 90° C., 100° C., etc.; as shown for example in FIG. 7, etc.), once, upon receipt of a user query, upon user interface activation (e.g., wake), and/or with any suitable timing. In an example, the displayed ETC can be updated and/or presented to the user with the determined ETC when an update event occurs. The update event can be: when a foodstuff parameter reaches or surpasses an update threshold of a set of update thresholds; when consecutive determined ETCs within a predetermined time window are consistent and/or substantially similar; when a predetermined number of ETCs have been determined; when a predetermined number of foodstuff parameters have been made; when a determined number of timesteps have passed; and/or any other suitable event. The update thresholds preferably refer to a current foodstuff parameter or state where information to presented to the user is updated when the update threshold is met or exceeded. However, the update thresholds can be predetermined times, predetermined time-temperature combinations, predetermined points on each temperature curve, and/or otherwise be defined. The set of update thresholds can be evenly distributed (e.g., separated by approximately the same amount of time such as 1 min, 5 min, 10 min, etc.; separated by approximately the same change in foodstuff parameter such as 5° C., 10° C., etc.; etc.) and/or unevenly distributed (e.g., be more sparse when a rate of change of the foodstuff parameter or state is lower and be more dense when a rate of change of the foodstuff parameter is greater, as shown for example in FIG. 7; be sparse along the initial section(s) of the curve, and be denser within the target temperature regions; etc.). In an illustrative example, the displayed time can be updated based on the determined ETC every 10° C. change until the current temperature (e.g., measured or estimated using the state estimator) is within 5° C. of the target temperature, wherein the displayed time can be updated based on the determined ETC after every 1° C. change.

In some variants, the information can be updated according to a countdown, which allows the system to continue updating a displayed ETC by counting down according to a unit of time (e.g., seconds, minutes, hours, etc.), even when the displayed ETC is not updated using the determined ETC. In these variants, the information can be continually updated according to the countdown (e.g., a separate clock that continually updates the ETC based on an elapsed time). In an illustrative example, the displayed ETC can be updated with the determined ETC when the update event occurs, and the displayed ETC can be updated based on a wall clock in the interim (e.g., example shown in FIG. 9).

In some embodiments, the information, including but not limited to the ETC, presented to the user can be processed. Processing the information can function to decrease the amount of discontinuities within the presented information, decrease the chance that inaccurate information is presented to the user, and/or otherwise improve a user experience with the presented information. Examples of information processing can include: smoothing information, averaging information, detecting outliers and/or inliers, removing outliers and/or inliers, and/or otherwise processing the information. The information can be processed based on information calculated from preceding foodstuff states, based on information from predicted future foodstuff states, based on modelled information, and/or based on any suitable information. In an illustrative example, the ETC can be smoothed and/or averaged with ETCs determined from one or more preceding foodstuff states (e.g., the preceding 1, 2, 3, 5, 10, 20, 30, 50, 100, etc. ETCs; ETC back to the initial ETC estimate; etc.). However, the information can be otherwise processed.

In some embodiments, no information can be presented to a user until the error in the information is within a predetermined threshold and/or a predetermined amount of determined information is in agreement (e.g., three or more pieces of consecutively determined information are the same and/or differ by at most a predetermined threshold). In an illustrative example, the first time the ETC is presented to the user can be after the determined cooking curve has not changed after a predetermined number (e.g., 3, 5, 10, 20, etc.) of foodstuff state calculations. However, approximate information can be presented, the determined information can be presented (e.g., with a confidence interval, without additional details, etc.), and/or any suitable information can be presented at any suitable time.

5. Specific Examples

Figure 6:
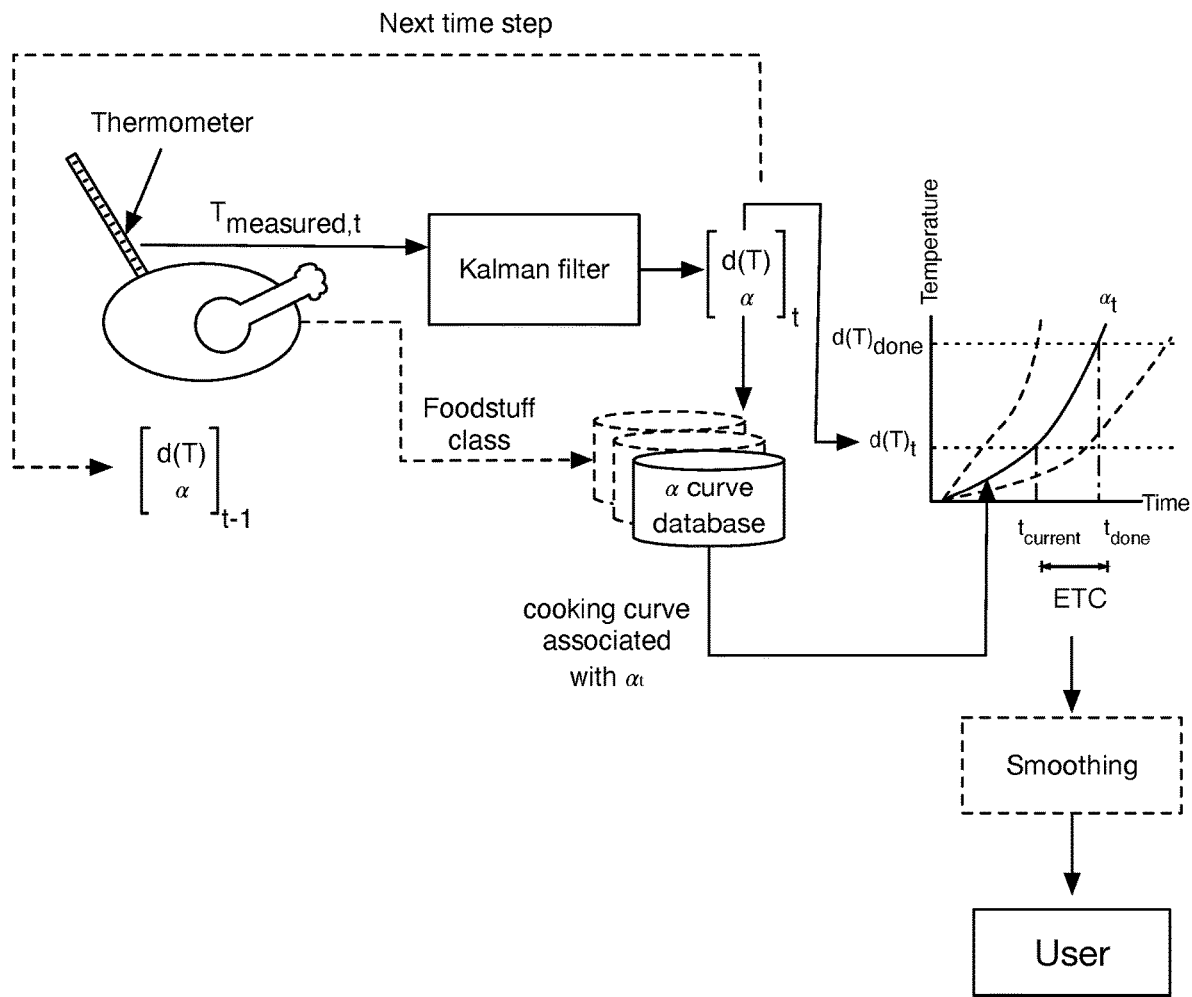
FIG. 6 is a schematic representation of an example embodiment of the method.

In a specific example of the method, as shown in FIGS. 3 and 6, determining the estimated time to completion can include identifying the type of foodstuff. In this example, a user can select the foodstuff identity (foodstuff class) at the user interface. The foodstuff can then be cooked (e.g., in a cooking system). During cooking, the temperature of the foodstuff can be measured. A modified Kalman filter can be used to determine the actual temperature (e.g., correct for measurement noise) of the foodstuff and to determine the temperature curve parameter (α) that the foodstuff is currently following. The modified Kalman filter can be initialized with α=1, with subsequent values updating based on the measured foodstuff temperature and the modifier Kalman filter. In this specific example, the current measured foodstuff temperature, the previously-determined foodstuff temperature, and the previously-determined temperature curve parameter value are used to determine the current actual foodstuff temperature and temperature curve parameter value. The temperature curve fit parameters for the foodstuff class can be retrieved (e.g., from a look-up table on the computing system) based on the current temperature curve parameter value and current foodstuff temperature. The estimated time to completion (ETC) can be calculated based on: the time for the foodstuff to reach the target temperature, as determined based on the temperature curve specified by the current temperature curve parameter value (α), and the estimated current time, as determined using the determined temperature curve (e.g., estimated current time is $t_{current}=C_{Tcurrent}+D_{Tcurrent}*1/\alpha_{current}$ and $t_{target}=C_{Ttarget}+D_{Ttarget}*1/\alpha_{current}$; $ETC=t_{target}-t_{current}$). In a first specific example, the estimated completion time and the estimated current time can be determined based on the temperature curve parameters associated with the current temperature window (that the current actual foodstuff temperature falls into) for the current α. In a second specific example, the estimated current time is determined based on the temperature curve parameters associated with the current temperature window (that the current actual foodstuff temperature falls into) for the current α, and the estimated completion time is determined based on the temperature curve parameters associated with the target temperature window (that the target temperature falls into) for the current α. However, the estimated completion time and estimated current time can be otherwise determined. In this specific example, the ETC can be indicated to the user at the user interface. However, determining the estimated time to completion can be performed in any suitable manner.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A cooking system, comprising a processing system configured to:
   receive a foodstuff parameter measured using a sensor;
   determine a current foodstuff parameter and a current cooking curve parameter using a Kalman filter, wherein inputs to the Kalman filter comprise the measured foodstuff parameter, a prior foodstuff parameter, and a prior cooking curve parameter;
   access a cooking curve associated with the current cooking curve parameter;
   calculating an estimated time associated with cooking completion based on a difference between:
      a current time associated with the current foodstuff parameter on the cooking curve; and
      a completion time associated with a target foodstuff parameter on the cooking curve; and
   present the estimated time to a user of the cooking system.

2. The cooking system of claim 1, wherein the current cooking curve parameter is associated with a rate of change of the cooking curve.

3. The cooking system of claim 1, further comprising a heating element configured to heat foodstuff within a cooking cavity, wherein the estimated time is determined while heating the foodstuff using the heating element.

4. The cooking system of claim 3, further comprising a housing, wherein the housing defines the cooking cavity, wherein the heating element and the processing system are mounted to the housing.

5. The cooking system of claim 1, wherein the sensor comprises a temperature probe.

6. The cooking system of claim 1, wherein the cooking curve is associated with the foodstuff class.

7. The cooking system of claim 6, wherein the processor is further configured to select the target foodstuff parameter based on at least one of the foodstuff class or a user preference.

8. The cooking system of claim 1, wherein the current foodstuff parameter comprises a temperature change relative to an initial temperature of the foodstuff.

9. The cooking system of claim 1, wherein the processor is configured to present an updated estimated time after measuring the foodstuff parameter a predetermined number of times.

10. The cooking system of claim 1, wherein the processing system is communicably coupled to a database of cooking curves, wherein each cooking curve in the database of cooking curves is associated with a different cooking curve parameter.

* * * * *